United States Patent [19]

Hirai et al.

[11] Patent Number: 4,880,874

[45] Date of Patent: Nov. 14, 1989

[54] RESIN OF POLYCARBONATE AND GRAFT COPOLYMER OF UNSATURATED EPOXY MONOMER AND ETHYLENE-α-OLEFIN BASE RUBBER

[75] Inventors: Mikio Hirai; Tokuo Tatsuda; Tomio Yoshida, all of Niihama, Japan

[73] Assignee: Sumitomo Naugatuck Co., Ltd., Osaka, Japan

[21] Appl. No.: 246,817

[22] PCT Filed: Jan. 29, 1988

[86] PCT No.: PCT/JP88/00074

§ 371 Date: Sep. 7, 1988

§ 102(e) Date: Sep. 7, 1988

[87] PCT Pub. No.: WO88/05800

PCT Pub. Date: Aug. 11, 1988

[30] Foreign Application Priority Data

Jan. 29, 1987 [JP] Japan .................................. 62-20037

[51] Int. Cl.$^4$ ............................................. C08L 69/00
[52] U.S. Cl. ........................................ 525/67; 525/148
[58] Field of Search ................. 525/67, 146, 148, 468

[56] References Cited

FOREIGN PATENT DOCUMENTS 197457A 9/1984 Japan .

Primary Examiner—Theodore E. Pertilla

[57] ABSTRACT

A resin composition comprising (A) 10 to 99% by weight of a polycarbonate resin and (B) 90 to 1% by weight of a resin which comprises (b-1) 100 to 10% by weight of a copolymer which is obtainable by polymerizing 1 to 800 parts by weight of an unsaturated epoxy monomer and 0 to 2,000 parts by weight of other copolymerizable monomer in the presence of 100 parts by weight of an ethylene-α-olefin base rubber, and (b-2) 0 to 90% by weight of a copolymer which is obtainable by polymerizing at least one monomer selected from the group consisting of aromatic vinyl compounds, cyanated vinyl compounds and alkyl unsaturated carboxylates.

2 Claims, No Drawings

RESIN OF POLYCARBONATE AND GRAFT COPOLYMER OF UNSATURATED EPOXY MONOMER AND ETHYLENE-α-OLEFIN BASE RUBBER

FIELD OF THE INVENTION

The present invention relates to a polycarbonate resin composition having improved impact resistance, particularly impact strength having less dependency on an article thickness and weld strength.

DESCRIPTION OF THE RELATED ART

Polycarbonate resins are used as engineering resins having good impact strength and heat resistance and in many technical fields. However, as a thickness of a molded article made of the polycarbonate resin increases, its impact strength greatly decreases (dependency of impact strength on thickness).

To improve the impact strength of the polycarbonate resin, many proposals have been made such as addition of an ABS resin (acrylonitrile-diene rubber-styrene copolymer) to the polycarbonate resin (Japanese Patent Publication No. 15225/1963), addition of an AES resin (acrylonitrile-ethylene/propylene rubber-styrene copolymer) to the polycarbonate resin (Japanese Patent Publication No. 48547/1973) and addition of an olefin-glycidylmethacrylate copolymer to the polycarbonate resin (Japanese Patent Publication No. 4897/1969).

Since the number of gates in a mold and flow state of resin melt should be changed according to a shape and size of the article to be molded in injection molding which is one of the most common molding methods, the molded article has so-called a "weld part" at which at least two portions of resin melt flowing in different directions meet each other. However, the article made of the conventional resin compositions has insufficient so-called "weld strength", strength of an article at the weld part in view of the practical use, and the polycarbonate composition is not an excellent material from the practical view point.

As the result of the extensive study by the present invention, it has been found that a resin composition comprising a polycarbonate resin and a specific resin has impact strength which is less dependent on an article thickness and greatly increased weld strength, and the present invention has been completed.

DISCLOSURE OF THE INVENTION

Accordingly, the present invention provides a resin composition comprising (A) 10 to 99% by weight of a polycarbonate resin and
(B) 90 to 1% by weight of a resin which comprises
(b-1) 100 to 10% by weight of a copolymer which is obtainable by polymerizing 1 to 800 parts by weight of an unsaturated epoxy monomer and 0 to 2,000 parts by weight of other copolymerizable monomer in the presence of 100 parts by weight of an ethylene-α-olefin base rubber, and
(b-2) 0 to 90% by weight of a copolymer which is obtainable by polymerizing at least one monomer selected from the group consisting of aromatic vinyl compounds, cyanated vinyl compounds and alkyl unsaturated carboxylates.

DETAILED DESCRIPTION OF THE INVENTION

The resin component of the present invention will be illustrated in detail.

Polycarbonate resin

As the polycarbonate resin (A), aromatic polycarbonates, aliphatic polycarbonates, aliphatic-aromatic polycarbonates and the like are exemplified.

Generally, the polycarbonate resin is a polymer or a copolymer prepared from a bisphenol type compound such as 2,2-bis(4-oxyphenyl)alkanes, bis(4-oxyphenyl)ethers and bis(4-oxyphenyl)sulfones, sulfides or sulfoxides. For some end uses, polymers of halogen-substituted bisphenol type compounds may be used.

Preparation methods and kinds of polycarbonate resins are described, for example, in "Polycarbonate Resins" published by Daily Technology Newspaper Company (Nikkan Kogyo Shinbun-sha) (Sept. 30, 1969).

Resin (B)

The ethylene-α-olefin base rubber constituting the copolymer (b-1) includes a copolymer of ethylene with propylene or butene (EPR), a terpolymer of ethylene, propylene or butene and a non-conjugated diene (EDPM) and the like. These may be used independently or as a mixture thereof.

Examples of the non-conjugated diene contained in the terpolymer (EPDM) are dicyclopentadiene, ethylidenenorbornene, 1,4-hexadiene, 1,4-cyclobutadiene, 1,5-cyclooctadiene and the like.

In the copolymer (EPR) and the terpolymer (EPDM), a molar ratio of ethylene to propylene or butene is preferably from 5:1 to 1:3.

In the terpolymer (EPDM), the non-conjugated diene is contained in an amount corresponding to an iodine value of 2 to 50.

The unsaturated epoxy monomer constituting the copolymer (B-1) includes an unsaturated glycidyl ester of the formula:

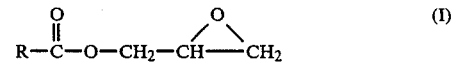

wherein R is a hydrocarbon group having a copolymerizable epoxide unsaturated bond, an unsaturated glycidyl ether of the formula:

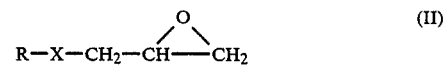

wherein R is the same as defined in the formula (I), and X is —CH$_2$—O— or

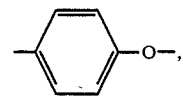

and an epoxyalkene of the formula:

wherein R is the same as defined in the formula (I), and R' is hydrogen or methyl.

Specific examples of these epoxide monomers are glycidyl acrylate, glycidyl methacrylate, mon- and diglycidyl ester of itaconic acid, mono-, di- and tri-glycidyl ester of butenetricarboxylic acid, mono- and diglycidyl ester of citraconic acid, mono- and di-glycidyl ester of endo-cis-bicyclo[2.2.1]hept-5-ene-2,3-dicarbocylic acid (trade name: Nadic acid), mono- and di-glycidyl ester of endo-cis-bicycle[2.2.1]hept-5-ene-2-methyl-2,3-dicarboxylic acid (trade name: Methylnadic acid), mono- and di-glycidyl ester of allylsuccinic acid, glycidyl ester of p-styrene-carboxylic acid, allylglycidyl ether, 2-methylallylglycidyl ether, styrene-p-glycidyl ether or p-glycidylstyrene, 3,4-epoxy-1-butene, 3,4-epoxy-3-methyl-1-butene, 3,4-epoxy-1-pentene, 3,4-epoxy-3-methyl-1-pentene, 5,6-epoxy-1-hexene, vinylcyclohexene monoxide, and the like.

Other copolymerizable monomer constituting the copolymer (b-1) includes (i) aromatic vinyl compounds (e.g. styrene, α-methylstyrene, α-chlorostyrene, p-tert.-butylstyrene, p-methylstyrene, methylstyrene, o-chlorostyrene, p-chlorostyrene, 2,5-dichlorostyrene, 3,4-dichlorostyrene, p-bromostyrene, o-bromostyrene, 2,5-dibromostyrene, 3,4-dibromostyrene, etc.), (ii) cyanated vinyl compounds (e.g. acrylonitrile, methacrylonitrile, maleonitrile, fumaronitrile, etc.), (iii) alkyl unsaturated carboxylates (e.g. methyl acrylate, ethyl acrylate, butyl acrylate, methyl methacrylate, ethyl methacrylate, butyl methacrylate, hydroxyethyl acrylate, hydroxyethyl methacrylate, hydroxypropyl methacrylate, etc.), (iv) unsaturated carboxylic acids (e.g. acrylic acid, methacrylic acid, etc.), (v) unsaturated dicarboxylic anhydrides (e.g. maleic anhydride, itaconic anhydride, citraconic anhydride, aconitic anhydride, hymic anhydride, etc.), (vi) maleimide compounds (e.g. maleimide, N-methylmaleimide, N-ethylmaleimide, N-butylmaleimide, N-laurylmaleimide, N-cyclohexylmaleimide, N-phenylmaleimide, N-o-chlorophenylmaleimide, etc.). One or more of them can be used. Among them, at least one compound selected from the group consisting of the aromitic vinyl compounds (i), the cyanated vinyl compounds (ii) and the alkyl unsaturated carboxylates (iii) is preferred.

The copolymer (b-1) is prepared by copolymerizing 1 to 800 parts be weight of the unsaturated epoxy monomer and 0 to 2,000 parts by weight of other copolymerizable monomer in the presence of 100 parts by weight of the ethylene-α-olefin base rubber.

When the amount of the unsaturated epoxy monomer is outside the range of 1 to 800 parts by weight, dependency of the impact strength on thickness and weld strength of the final composition are not improved.

When the amount of other copolymerizable monomer exceeds 2,000 parts by weight, dependency of the impact strength on thickness and weld strength are not improved either.

In view of the dependency of the impact strength on thickness and weld strength as well as processability, preferably 1 to 400 parts by weight of the unsaturated epoxy monomer and 0 to 1,000 parts by weight of other copolymerizable monomer are used per 100 parts by weight of the ethylene-α-olefin base rubber.

The copolymer (b-2) constituting the resin (B) is prepared by polymerizing at least one monomer selected from the group consisting of the aromatic vinyl compounds, the cyanated vinyl compounds and the alkyl unsaturated carboxylates.

As the aromatic vinyl compounds, the cyanated vinyl compounds and the alkyl unsaturated carboxylates, those used for preparing the copolymer (b-1) can be exemplified.

Particularly, preferred is a polymer comprising 10 to 100% by weight of the aromatic vinyl compound, 0 to 40% by weight of the cyanated vinyl compound and 0 to 90% by weight of the alkyl unsaturated carboxylate.

As the preparation method of the copolymers (b-1) and (b-2), there is no limitation and any of emulsion, suspension, bulk, solution, emulsion-suspension and bulk-suspension polymerization may be employed.

The resin (B) comprises 100 to 10% by weight of the above described copolymer (b-1) and 0 to 90% by weight of the copolymer (b-2). When the content of the copolymer (b-2) exceeds 90% by weight, dependency of the impact strength on thickness and weld strength are not improved. Preferably, the resin (B) comprises 100 to 20% by weight of the copolymer (b-1) and 0 to 80% by weight of the copolymer (b-2).

The resin composition comprises 10 to 99% by weight of the polycarbonate resin (A) and 90 to 1% by weight of the resin (B). When the content of the polycarbonate resin (A) is less than 10% by weight, the heat resistance is greatly deteriorated, and the molded resin has lower weld strength. When it exceeds 99% by weight, dependency of the impact strength on thickness is worsened and weld strength is decreased.

There is no limitation on a sequence of mixing the polycarbonate resin (A) and the copolymers (b-1) and (b-2) constituting the resin (B). For example, the copolymers (b-1) and (b-2) are premixed and then mixed with the polycarbonate resin (A). Alternatively, all three components are mixed together.

As mixing means, any of conventional mixing apparatuses such as a Banbury mixer, a single screw extruder and a twin screw extruder having a compounding block may be used.

During mixing, not only polyolefin resins such as polyethylene, polypropylene and ethylene-propylene copolymer but also a conventionally used additives such as a dye, a pigment, a stabilizer, a plasticizer, an antistatic agent, an ultraviolet light absorbing agent, a lubricant, a filler and the like can be added.

The present invention will be illustrated by following examples, which will not limit the scope of the present invention.

Examples and Comparative Examples

A polycarbonate resin (A) and a resin (B) or, for comparison, a polycarbonate resin and an olefin-glycidyl methacrylate copolymer, an ABS resin or an AES resin were compounded in a ratio shown in Table by a twin screw extruder to prepare each resin composition, and its physical properties were measured.

Polycarbonate (A)
Panlite L-1250 W (manufactured by Teijin Kasei)
Resin (B)
(1) Copolymer (b-1(1))

This copolymer was prepared by dissolving 250 parts by weight of EPDM having an iodine value of 8.5, a Mooney viscosity of 61 and a propylene content of 43% by weight and containing ethylidenenorbornene as a diene component in 3,000 parts by weight of n-hexane and 2,000 parts by weight of ethylene dichloride, adding 50 parts by weight of glycidyl methacrylate and 1 part by weight of benzoyl peroxide and then effecting polymerization at 67° C. for 10 hours in a nitrogen atmosphere. The polymerization liquid was contacted with a large excess amount of methanol to precipitate the product, which was separated and dried to obtain the copolymer.

(2) Copolymer (b-1(2))

In the same manner as in (1) but dissolving 240 parts by weight of EPDM having an iodine value of 15.3, a Mooney viscosity of 67 and a propylene content of 50% by weight and containing ethylidenenorbornene as a diene component in 3,000 parts by weight of n-hexane and 2,000 parts by weight of ethylene dichloride and adding 40 parts by weight of glycidyl methacrylate, 80 parts by weight of acrylonitrile, 240 parts by weight of styrene and 8 parts by weight of benzoly peroxide, the copolymer was prepared.

(3) Copolymer (b-1(3))

In the same manner as in (2) but using glycidyl methacrylate, acrylonitrile, styrene and benzoyl peroxide in an amount of 20, 400, 1,200 and 32 parts by weight, respectively, the copolymer was prepared.

(4) Copolymer (b-2)

To 100 parts by weight of a mixture of 70% by weight of styrene and 30% by weight of acrylonitrile, 0.1 part by weight of tert.-dodecylmercaptan was added to prepolymerize them at 90° C. for 3 hours in a bulk state. Then, 210 parts by weight of water, 1.0 part by weight of methyl-cellulose and 0.3 part by weight of benzoyl peroxide were added, and a temperature of an aqueous dispersion was raised from 30° C. to 90° C. to proceed polymerization for 10 hours in an aqueous dispersion system. After dehydration, the copolymer having an intrinsic viscosity of 0.50 was obtained.

ABS resin (C-(1))

A resin consisting of a graft copolymer produced according to the below described method alone or a mixture of said graft copolymer and the above described copolymer (b-2).

After mixing 50 parts by weight (as the solid material) of polybutadiene (gel content, 90%), 0.5 part by weight of potassium persulfate, 0.5 part by weight of potassium oleate and 0.3 part by weight of dodecylmercaptan, 36 parts by weight of styrene and 14 parts by weight of acrylonitrile were added and polymerized at 70° C. for 3 hours followed by aging for 1 (one) hour. The product was salted out, dehydrated and dried to obtain a graft copolymer having a particle size of 0.3 to 0.4 μm and a rubber content of 50 % by weight.

AES resin (C-(2))

A resin consisting of a graft copolymer produced according to the below described method alone or a mixture of said graft copolymer and the above described copolymer (b-2).

250 Parts by weight of EPDM having an iodine value of 15.3, a Mooney viscosity of 67, a propylene content of 50 % by weight and containing ethylidenenorbornene as a diene component was dissolved in 3,000 parts by weight of n-hexane and 2,000 parts by weight of ethylene dichloride, and then 80 parts by weight of acrylonitrile, 240 parts by weight of styrene and 8 parts by weight of benzoyl peroxide were added and polymerized at 67° C. for 10 hours in a nitrogen atmosphere. The polymer liquid was contacted to a large excess amount of methanol to precipitate the product, which was separated and dried to obtain a graft copolymer having a rubber content of 50% by weight.

TABLE

| Example No. | 1 | 2 | 3 | 4 | 5 | 6 |
|---|---|---|---|---|---|---|
| Composition (parts by weight) | | | | | | |
| Polycarbonate resin (A) | 90 | 90 | 70 | 50 | 50 | 30 |
| Resin (B) | | | | | | |
| Copolymer (b-1(1)) | 10 | | | | | |
| Copolymer (b-1(2)) | | 10 | | 30 | | |
| Copolymer (b-1(3)) | | | 30 | | 50 | 70 |
| Copolymer (b-2) | | | | 20 | | |
| Olefin-glycidyl copolymer*1 | | | | | | |
| ABS or AES resin | | | | | | |
| Graft copolymer (C-1) | | | | | | |
| Graft copolymer (C-2) | | | | | | |
| Copolymer (b-2) | | | | | | |
| Weld strength at −30° C. (kg. cm) (DuPont impact strength at a weld part) | 480 | 550 | 420 | 350 | 370 | 230 |
| Impact strength at 20° C. (kg. cm/cm²) (¼", Notched Izod) | 67.5 | 72.3 | 68.1 | 58.3 | 53.2 | 49.3 |

| Comparative Example No. | 1 | 2 | 3 | 4 | 5 | 6 |
|---|---|---|---|---|---|---|
| Composition (parts by weight) | | | | | | |
| Polycarbonate resin (A) | 100 | 90 | 70 | 50 | 70 | 50 |
| Resin (B) | | | | | | |
| Copolymer (b-1(1)) | | | | | | |
| Copolymer (b-1(2)) | | | | | | |
| Copolymer (b-1(3)) | | | | | | |
| Copolymer (b-2) | | | | | | |
| Olefin-glycidyl copolymer*1 | | 10 | | | | |
| ABS or AES resin | | | | | | |
| Graft copolymer (C-1) | | | 30 | 30 | | |
| Graft copolymer (C-2) | | | | | 30 | 30 |
| Copolymer (b-2) | | | | 20 | | 20 |
| Weld strength at −30° C. (kg/cm) (DuPont impact strength at a weld part) | 620 | 45 | 30 | 15 | 20 | <10 |
| Impact strength at 20° C. (kg. cm/cm²) (¼", Notched Izod) | 14.3 | 66.8 | 57.1 | 53.2 | 43.2 | 40.3 |

Note:
*1Ethylene-glycidyl methacrylate copolymer (Weight ratio, 90/10)

Weld strength

A resin melt (250° to 310° C.) was injected from two gates (each 2.5×2.5 mm) with a distance of 100 mm to form a test piece of 3 mm in thickness, 150 mm in length and 150 mm in width.

The test piece was placed on a jig having a height of 80 cm, an inner diameter of 120 mm and an outer diameter of 126 mm.

In a low temperature room kept at −30° C., a steel ball of 1 kg was fallen onto a center of the test piece, and the maximum energy (kg.cm) with which the test piece was not broken was recorded.

EFFECTS OF THE INVENTION

Since the composition of the present invention has less dependency of impact strength on thickness than the conventional composition and good weld strength, it can impart good impact resistance to a molded article having a thick wall and a molded article having a complicated shape and the weld part.

What is claimed is:

1. A resin composition comprising
(A) 10 to 99% by weight of a polycarbonate resin and
(B) 90 to 1% by weight of a resin which comprises (b-1) 100 to 10% by weight of a copolymer which is obtainable by polymerizing 1 to 800 parts by weight of an unsaturated epoxy monomer and 0 to 2,000 parts by weight of other copolymerizable monomer in the presence of 100 parts by weight of an ethylene-α-olefin base rubber, and (b-2) 0 to 90% by weight of a copolymer which is obtainable by polymerizing at least one monomer selected from the group consisting of aromatic vinyl compounds, cyanated vinyl compounds and alkyl unsaturated carboxylates.

2. The resin composition according to claim 1, wherein other copolymerizable monomer is at least one monomer selected from the group consisting of aromatic vinyl compounds, cyanated vinyl compounds and alkyl unsaturated carboxylates.

* * * * *